US012717204B2

United States Patent

(12) United States Patent
Mao et al.

(10) Patent No.: US 12,717,204 B2
(45) Date of Patent: Aug. 25, 2026

(54) ELECTRONIC PAPER DISPLAY AND DRIVING METHOD THEREOF

(71) Applicant: HKC CORPORATION LIMITED, Shenzhen (CN)

(72) Inventors: Han Mao, Shenzhen (CN); Junfeng Xie, Shenzhen Guangdong (CN)

(73) Assignee: HKC CORPORATION LIMITED, Shenzhen (CN)

(*) Notice: Subject to any disclaimer, the term of this patent is extended or adjusted under 35 U.S.C. 154(b) by 254 days.

(21) Appl. No.: 18/732,860

(22) Filed: Jun. 4, 2024

(65) Prior Publication Data

US 2025/0013116 A1 Jan. 9, 2025

(30) Foreign Application Priority Data

Jul. 6, 2023 (CN) ........................ 202310824544.9

(51) Int. Cl.
*G02F 1/1676* (2019.01)
*G02F 1/16757* (2019.01)
*G02F 1/1685* (2019.01)

(52) U.S. Cl.
CPC ........ *G02F 1/1676* (2019.01); *G02F 1/16757* (2019.01); *G02F 1/1685* (2019.01); *G02F 2202/36* (2013.01)

(58) Field of Classification Search
CPC .. G02F 1/1676; G02F 1/16757; G02F 1/1685; G02F 2202/36; G02F 1/167; G02F 1/16762; G09G 3/344
See application file for complete search history.

(56) References Cited

U.S. PATENT DOCUMENTS

2008/0136773 A1* 6/2008 Kim ........................ G09G 3/344 345/107
2013/0162693 A1* 6/2013 Li .......................... G09G 3/344 345/690

FOREIGN PATENT DOCUMENTS

| | | | |
|---|---|---|---|
| CN | 102012596 | A | 4/2011 |
| CN | 102621762 | A | 8/2012 |
| CN | 103424916 | A | 12/2013 |
| CN | 106054426 | A | 10/2016 |
| CN | 106842758 | A | 6/2017 |
| CN | 106909011 | A | 6/2017 |
| CN | 107315290 | A | 11/2017 |
| CN | 108139645 | A | 6/2018 |

(Continued)

*Primary Examiner* — Charles S Chang

(57) ABSTRACT

Provided is an electronic paper display and a driving method thereof. The electronic paper display includes a first substrate and a second substrate arranged oppositely, and an electronic ink layer disposed therebetween. A common electrode is provided on a side of the first substrate facing the electronic ink layer, and a plurality of pixel units are provided on a side of the second substrate facing the electronic ink layer. Each pixel unit includes two sub-pixel electrodes, each connected to respective one of two source lines, and the two source lines are both connected to a gate line. The two source lines and the two sub-pixel electrodes are spaced apart along a first direction. The common electrode includes two sub-common electrodes spaced apart along a second direction, and orthographic projections of the two sub-common electrodes on the two sub-pixel electrodes are spaced apart to form four independent sub-pixel opening areas.

18 Claims, 10 Drawing Sheets

(56) References Cited

FOREIGN PATENT DOCUMENTS

| | | | |
|---|---|---|---|
| JP | 2006343681 | A | 12/2006 |
| KR | 100851181 | B1 | 8/2008 |

* cited by examiner providing black potential particles and white potential particles in the microcapsules, a threshold voltage of the black potential particles is a positive voltage, and a threshold voltage of the white potential particles is a negative voltage — S101 applying a driving voltage to the sub-pixel electrodes and applying a common voltage to the sub-common electrodes during a display phase of the electronic paper display, values of the driving voltage and the common voltage are both variable, by adjusting a voltage difference between the driving voltage and the common voltage, the threshold voltage corresponding to the sub-pixel opening areas are changed, and the pixel unit displays five gray levels — S102

FIG. 15 providing red potential particles, green potential particles and blue potential particles in the microcapsules, a threshold voltage of the red potential particles is a positive voltage, a threshold voltage of the green potential particles is zero voltage, and a threshold voltage of the blue particles is a negative voltage — S201 applying a driving voltage to the sub-pixel electrodes and applying a common voltage to the sub-common electrodes during a display phase of the electronic paper display; values of the driving voltage and the common voltage are both variable, by adjusting a voltage difference between the driving voltage and the common voltage, the threshold voltage corresponding to the sub-pixel opening areas are changed, and the pixel unit displays seven gray levels — S202

FIG. 16

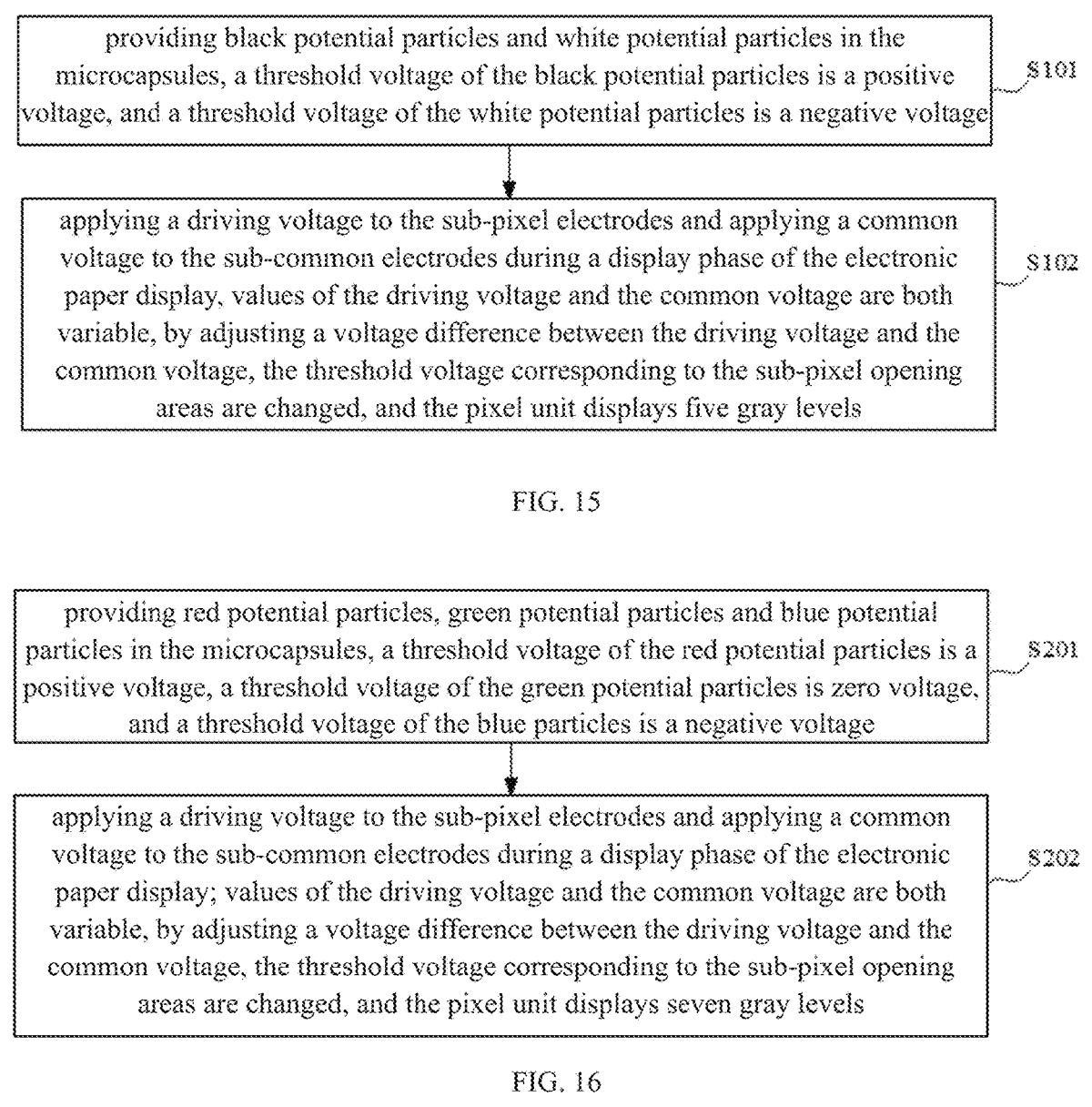

ELECTRONIC PAPER DISPLAY AND DRIVING METHOD THEREOF

CROSS-REFERENCE TO RELATED APPLICATIONS

The present application claims the benefit of Chinese patent application No. 202310824544.9 filed on Jul. 6, 2023, titled "Electronic Paper Display and Driving Method thereof", the entire contents of which are incorporated herein by reference.

TECHNICAL FIELD

The present application relates to the field of display technology, and in particular to an electronic paper display and a driving method thereof.

BACKGROUND

With the development of the display industry, people also put forward higher requirements for the display effect of the monitor, electronic ink (E-Ink) display because of its unique reflective display mode, gradually entered the public field of vision. At present, E-Ink display is mainly divided into monochrome display and color display. Monochrome display adopts monochrome E-Ink, which determines that the pixel unit of monochrome display can only display two colors, black and white, and can only display one of them every time; although color display adopts color E-Ink, which can mix many colors, the pixel unit of the color display can only display one of them every time, and the pixel unit of the color display can only display one of them every time. Although the color display adopts color e-ink, which can mix to display various colors, the pixel unit of the color display can only display one of the colors each time, which makes the color depth of each color of the e-ink lower, resulting in a narrower color gamut of the e-paper display, and the display effect is not detailed enough.

SUMMARY

Embodiments of the present application provide an electronic paper display and a driving method thereof. By arranging two source lines, two sub-pixel electrodes and two sub-common electrodes to form four mutually independent sub-pixel opening areas, the problem of existing electronic paper, that the color gamut of the display is narrow and the display effect is not detailed enough, can be solved.

The present application is implemented as follows: an electronic paper display includes a first substrate and a second substrate arranged oppositely to each other, and an electronic ink layer disposed between the first substrate and the second substrate. A common electrode is provided on a side of the first substrate facing the electronic ink layer, and a plurality of pixel units are provided on a side of the second substrate facing the electronic ink layer. Each pixel unit includes two sub-pixel electrodes, the two sub-pixel electrodes are each connected to respective one of two source lines, and the two source lines are both connected to a gate line. The two source lines and the two sub-pixel electrodes are arranged at intervals along a first direction, which is an extension direction of the gate line. The common electrode includes two sub-common electrodes arranged at intervals along a second direction, and orthographic projections of the two sub-common electrodes on the two sub-pixel electrodes are spaced apart from each other to form four mutually independent sub-pixel opening areas. The second direction is perpendicular to the first direction.

In one embodiment, the electronic ink layer includes a plurality of microcapsules, and each of the microcapsules is provided with potential particles of at least two colors.

The source lines are configured to apply a constant driving voltage to the sub-pixel electrodes within a preset duration, so that a threshold voltage is formed between a respective sub-pixel electrode and sub-common electrode corresponding to each of the sub-pixel opening areas. The threshold voltage is a voltage that drives the potential particles to move in a direction toward the first substrate.

In one embodiment, the two source lines are respectively a first source line and a second source line, the two sub-pixel electrodes are respectively a first sub-pixel electrode and a second sub-pixel electrode, and the two sub-common electrodes are respectively a first sub-common electrode and a second sub-common electrode.

The first source line is connected to the first sub-pixel electrode for applying a constant first driving voltage to the first sub-pixel electrode within a preset duration, so that a first threshold voltage is formed between the first sub-pixel electrode and the first sub-common electrode, and a second threshold voltage is formed between the first sub-pixel electrode and the second sub-common electrode.

The second source line is connected to the second sub-pixel electrode for applying a constant second driving voltage to the second sub-pixel electrode within a preset duration, a third threshold voltage is formed between the second sub-pixel electrode and the first sub-common electrode, and a fourth threshold voltage is formed between the second sub-pixel electrode and the second sub-common electrode.

In one embodiment, the electronic paper display further includes a plurality of driver chips, and the first source line and the second source line are respectively connected to one of the driver chips.

In one embodiment, an area of the orthographic projection of the first sub-common electrode on the first sub-pixel electrode, an area of the orthographic projection of the second sub-common electrode on the first sub-pixel electrode, an area of the orthographic projection of the first sub-common electrode on the second sub-pixel electrode, and an area of the orthographic projection of the second sub-common electrode on the second sub-pixel electrode are equal.

In one embodiment, the microcapsules are provided with black potential particles and white potential particles, the threshold voltage of the black potential particles is a positive voltage, and the threshold voltage of the white potential particles is a negative voltage.

Values of the driving voltages are variable, values of the threshold voltages are variable, and each of the pixel units has five gray levels.

In one embodiment, the microcapsules are provided with red potential particles, green potential particles and blue potential particles. The threshold voltage of the red potential particles is a positive voltage, the threshold voltage of the green potential particles is zero voltage, and the threshold voltage of the blue potential particles is a negative voltage.

Values of the driving voltages are variable, values of the threshold voltages are variable, and each of the pixel units has seven gray levels.

In one embodiment, the two source lines are both disposed between the two sub-pixel electrodes.

In one embodiment, the two sub-pixel electrodes are both disposed between the two source lines.

The advantageous effect of the electronic paper display provided by this application is as follows: compared with the existing technology, this application provides two source lines, two sub-pixel electrodes and two sub-common electrodes, and the two source lines and two sub-pixel electrodes are arranged at intervals along the first direction, and the two sub-common electrodes are arranged at intervals along the second direction. The orthographic projections of the two sub-common electrodes on the two sub-pixel electrodes are spaced apart from each other, to form four mutually independent sub-pixel opening areas. This allows dividing one pixel opening area in the existing pixel unit into four sub-pixel opening areas and providing a specific voltage difference for each sub-pixel opening area, so that one pixel unit can display multiple different colors, thus improving the color depth. The display panel having a plurality of such pixel units can therefore display more different colors, increasing the color gamut of the display panel.

Embodiments of the present application also provide a driving method of an electronic paper display, which is applied to the electronic paper display in the above embodiments and includes the following steps:

providing black potential particles and white potential particles in the microcapsules, a threshold voltage of the black potential particles is a positive voltage, and a threshold voltage of the white potential particles is a negative voltage; and applying a driving voltage to the sub-pixel electrodes and applying a common voltage to the sub-common electrodes during a display phase of the electronic paper display, values of the driving voltage and the common voltage are both variable; by adjusting a voltage difference between the driving voltage and the common voltage, the threshold voltage corresponding to the sub-pixel opening areas are changed, and the pixel unit displays five gray levels.

Embodiments of the present application also provide a driving method for an electronic paper display, which is applied to the electronic paper display in the above embodiments and includes the following steps:

providing red potential particles, green potential particles and blue potential particles in the microcapsules, a threshold voltage of the red potential particles is a positive voltage, a threshold voltage of the green potential particles is zero voltage, and a threshold voltage of the blue particles is a negative voltage; and applying a driving voltage to the sub-pixel electrodes and applying a common voltage to the sub-common electrodes during a display phase of the electronic paper display; values of the driving voltage and the common voltage are both variable; by adjusting a voltage difference between the driving voltage and the common voltage, the threshold voltage corresponding to the sub-pixel opening areas are changed, and the pixel unit displays seven gray levels.

The advantageous effect of the driving method of the electronic paper display provided by this application is that when applied to the above-mentioned electronic paper display, compared with the existing technology, this application provides two source lines, two sub-pixel electrodes and two sub-common electrodes, and the two source lines and two sub-pixel electrodes are arranged at intervals along the first direction, and the two sub-common electrodes are arranged at intervals along the second direction. The orthographic projections of the two sub-common electrodes on the two sub-pixel electrodes are spaced apart from each other, to form four mutually independent sub-pixel opening areas. This allows dividing one pixel opening area in the existing pixel unit into four sub-pixel opening areas and providing a specific voltage difference for each sub-pixel opening area, so that one pixel unit can display multiple different colors, thus improving the color depth. The display panel having a plurality of such pixel units can therefore display more different colors, increasing the color gamut of the display panel.

BRIEF DESCRIPTION OF THE DRAWINGS

FIG. 15 is a flowchart of a driving method for an electronic paper display provided in a third embodiment of the present application; and FIG. 16 is a flowchart of a driving method for an electronic paper display provided in a fourth embodiment of the present application.

Figure 1:
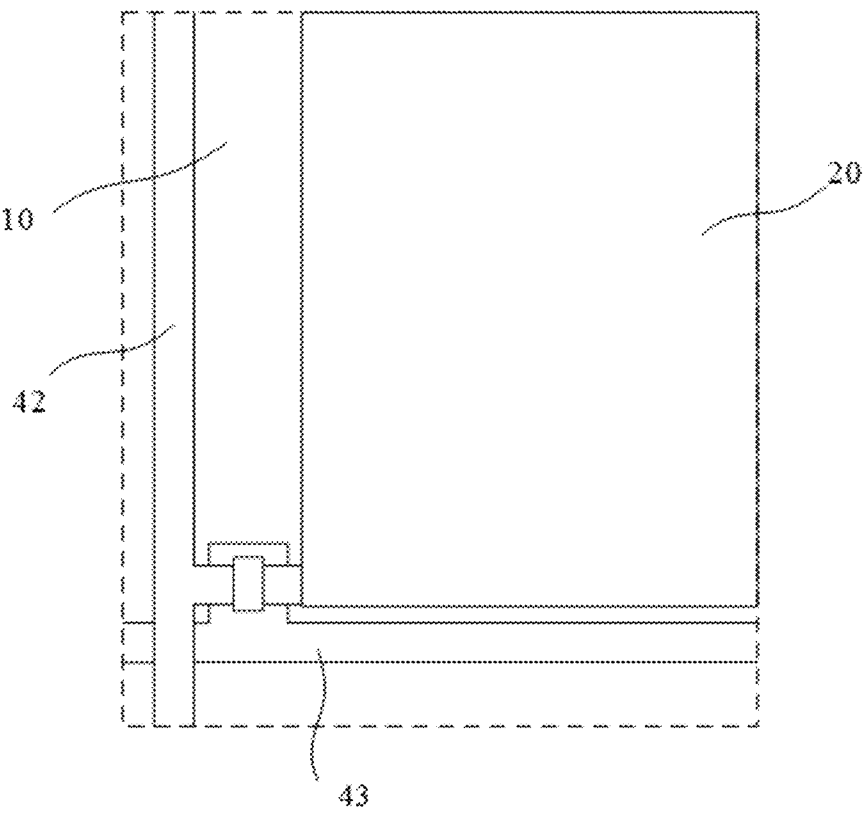
FIG. 1 is a top view of a pixel unit of an electronic paper display in the related art.

Reference signs are as follows: 1 first substrate; 10 common electrode; 11 sub-common electrode; 111 first sub-common electrode; 112 second sub-common electrode; 100 sub-pixel opening area; 101 first sub-pixel opening area; 102 second sub-pixel opening area; 103 third sub-pixel opening area; 104 fourth sub-pixel opening area;

2 second substrate; 20 pixel electrode; 3 electronic ink layer; 30 microcapsule; 300 potential particles;

4 pixel unit; 43 gate line; 42 source line; 421 first source line; 422 second source line; 41 sub-pixel electrode; 411 first sub-pixel electrode; and 412 second sub-pixel electrode.

DETAILED DESCRIPTION OF THE EMBODIMENTS

In order to make the purpose, technical proposals and advantages of the present application clearer, the present application will be further described in detail below with reference to the accompanying drawings and embodiments. It should be understood that the specific embodiments described herein are only for explaining the present application and are not intended to limit the present application.

It should be noted that when an element is referred to as being "fixed to" or "disposed on" another element, it can be directly on the other element or indirectly on the other element. When an element is referred to as being "connected to" another element, it can be directly connected to the other element or indirectly connected to the other element.

It should be understood that orientations or positional relationships indicated by the terms "length", "width", "upper", "lower", "front", "rear", "left", "right", "vertical", "horizontal", "top", "bottom", "inner", "outer", etc. are based on the orientations or positional relationships shown in the drawings and are only for the convenience of describing the present application and simplifying the description, and do not indicate or imply that the devices or elements must have a specific orientation, be constructed and operate in a specific orientation and therefore are not to be construed as limiting.

In addition, the terms "first" and "second" are merely used for descriptive purposes and cannot be understood as indicating or implying relative importance or implicitly indicating the quantity of indicated technical features. Therefore, features defined as "first" and "second" may explicitly or implicitly include one or more of these features. In the description of this application, "a plurality of" means two or more than two, unless otherwise explicitly and specifically defined.

It should also be noted that in the embodiments of the present application, the same reference numerals refer to the same parts or components. For the same components in the embodiments of the present application, only one of the parts or components may be labeled as an example in the figure. Where reference numerals are used, it should be understood that the same reference numerals apply to other identical parts or components.

Embodiments of the present application provide an electronic paper display and a driving method thereof, which solves the problem that the existing electronic paper display has a narrow color gamut and a display effect that is not detailed enough.

Referring to FIG. 1, in the related art, the display area of the electronic ink screen is composed of an entire column of pixel unit. Each pixel unit includes a gate line, a semiconductor layer, a source (data) line, a pixel electrode 20 and a common (com) electrode. The pixel electrode 20 is connected to the source line 42 through the semiconductor layer. The opening and closing of the semiconductor layer is controlled by the gate line 43, and the common electrode 10 maintains a constant potential. The overlapping portion of the pixel electrode 20 and the common electrode 10 is an opening area.

The color depth and color gamut of the electronic ink screen in the related art is determined by the type of electronic ink. The type of electronic ink may be black and white monochrome electronic ink, then the electronic ink screen is a black and white monochrome electronic ink screen. The electronic ink may also be a three-color electronic ink of red, green, and blue, then the electronic ink screen is a color electronic ink screen.

Figure 2:
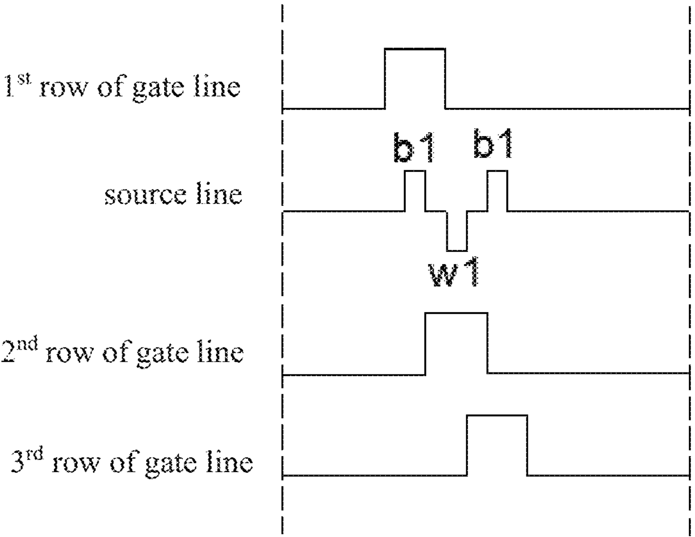
FIG. 2 is a timing diagram of the monochrome electronic ink in the related art.

When the electronic ink screen is a black and white monochrome electronic ink screen, since one pixel unit 4 has only one opening area, when the source line 42 provides a specified signal, one pixel unit 4 can only display one black b1 and one white w1. The color depth of each color is 1 bit. All pixel units 4 are combined together through an array to display black b1 and white w1 images. For example, for three rows and one column of pixel units 4, the timing sequence of the monochrome electronic ink is shown in FIG. 2. FIG. 2 shows that the source line 42 provides a signal b1 to the pixel unit 4 in the first row, provides a signal w1 to the pixel unit 4 in the second row, and provides a signal b1 to the pixel unit 4 in the third row, that is, the first, second, and third rows of pixel units 4 display black, white, and black respectively.

Figure 3:
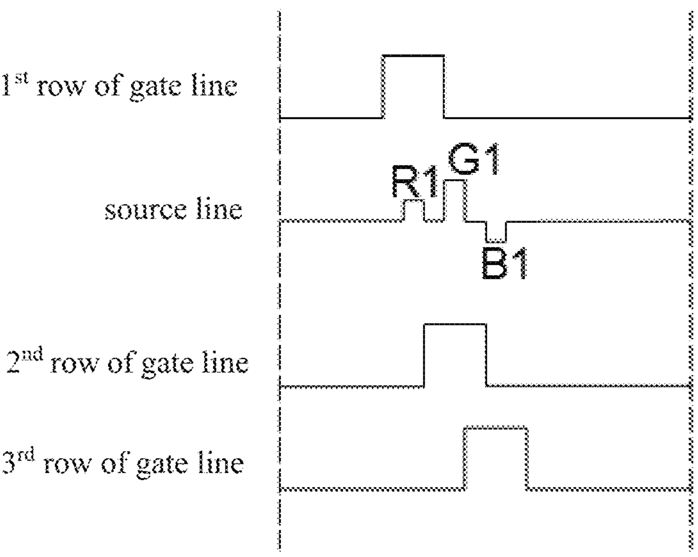
FIG. 3 is a timing diagram of red, green, and blue electronic ink in the related art.

When the electronic ink screen is a three-color screen of red, green, and blue, since one pixel unit 4 has only one opening area, when the source line 42 provides a specified signal, one pixel unit 4 can only display a red color R1, a green color G1, or a blue color B1. The color depth of each color is 1 bit. All pixel units 4 are combined together through an array to display red R1, green G1, and blue B1 images. For example, for three rows and one column of pixel units 4, the timing sequence of the three-color electronic ink of red, green and blue is shown in FIG. 3. FIG. 3 shows that the source line 42 provides a signal R1 to the pixel unit 4 in the first row, provides a signal G1 to the pixel unit 4 in the second row, and provides a signal B1 to the pixel unit 4 in the third row, that is, the first, second, and third rows of pixel units 4 display red, green, and blue respectively.

The electronic ink screen in the related art has only one opening area and can only display one color at a time. Therefore, the color depth of the color displayed by the pixel unit 4 is small. When a plurality of pixel units 4 are combined together, the types of color displayed on the screen are limited, making the color gamut on the electronic ink screen narrow.

First Embodiment

Figure 4:
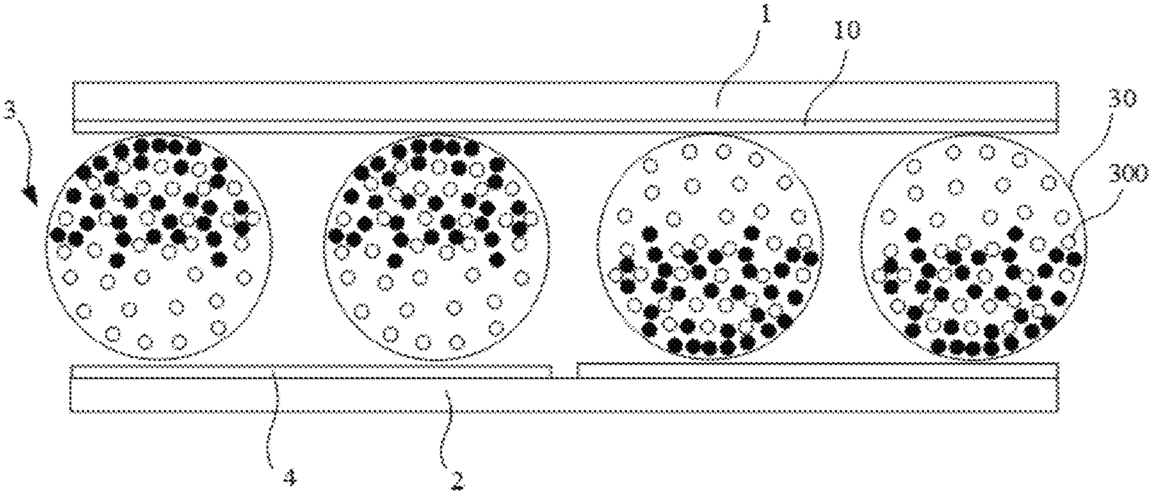
FIG. 4 is a schematic structural view of an electronic paper display provided in a first embodiment of the present application.
Figure 5:
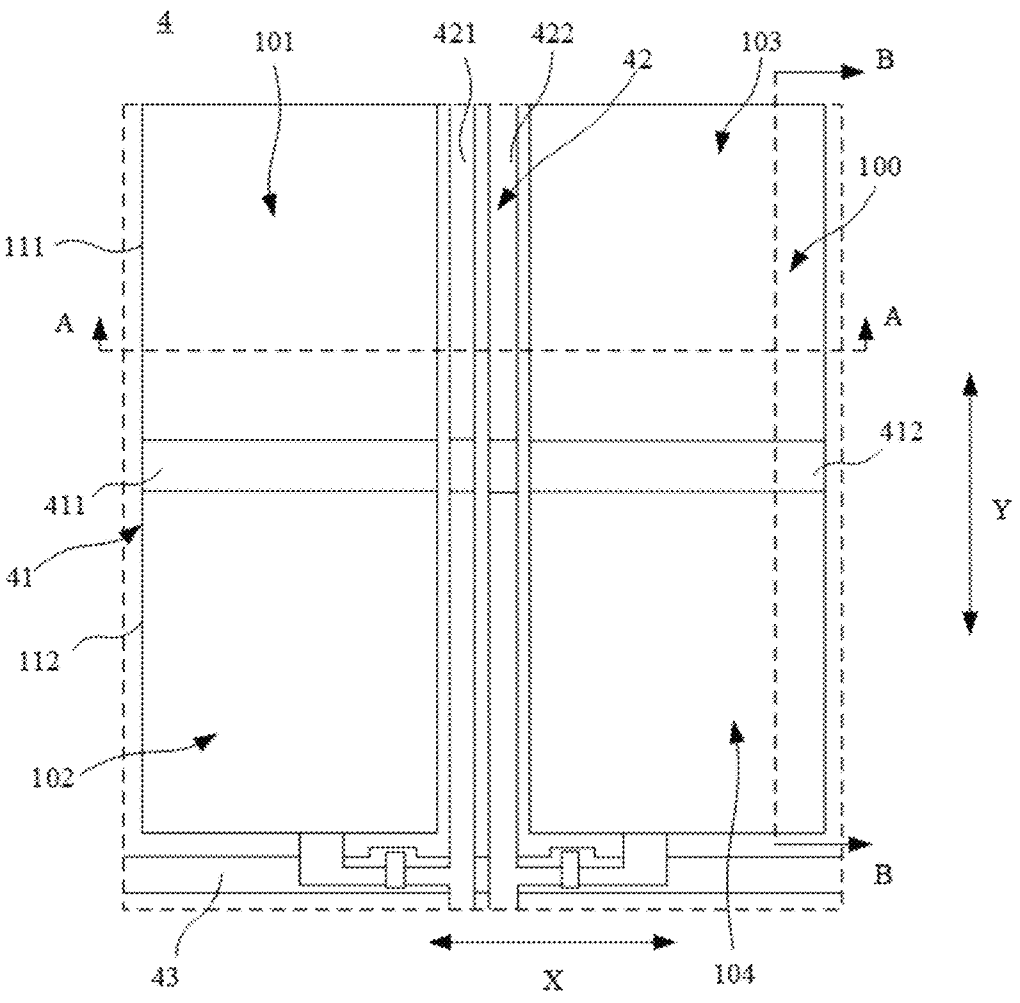
FIG. 5 is a top view of the pixel unit of the electronic paper display provided in the first embodiment of the present application.
Figure 6:
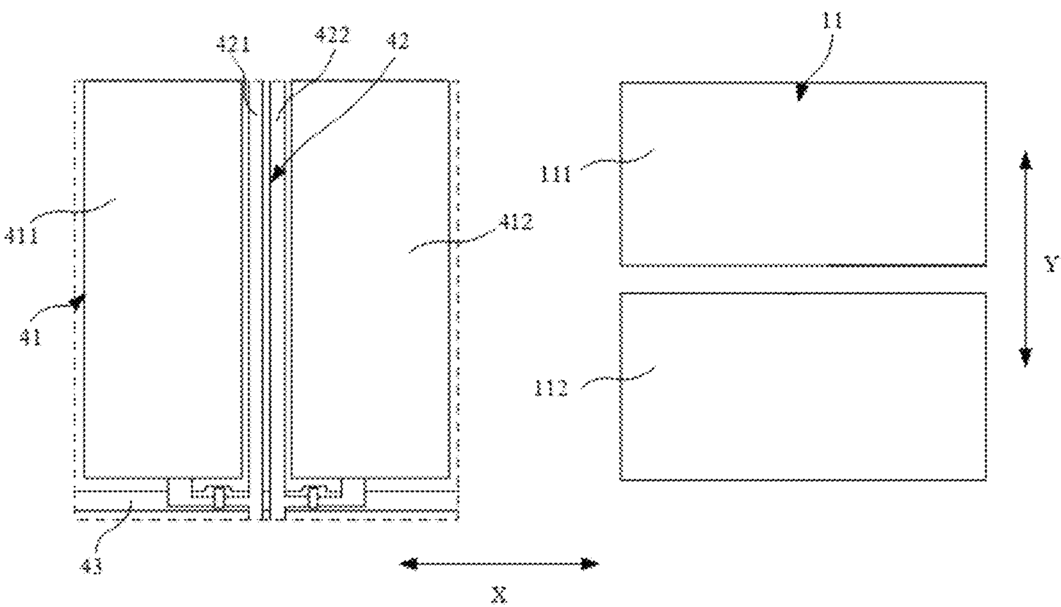
FIG. 6 is an exploded view of FIG. 5.
Figure 7:
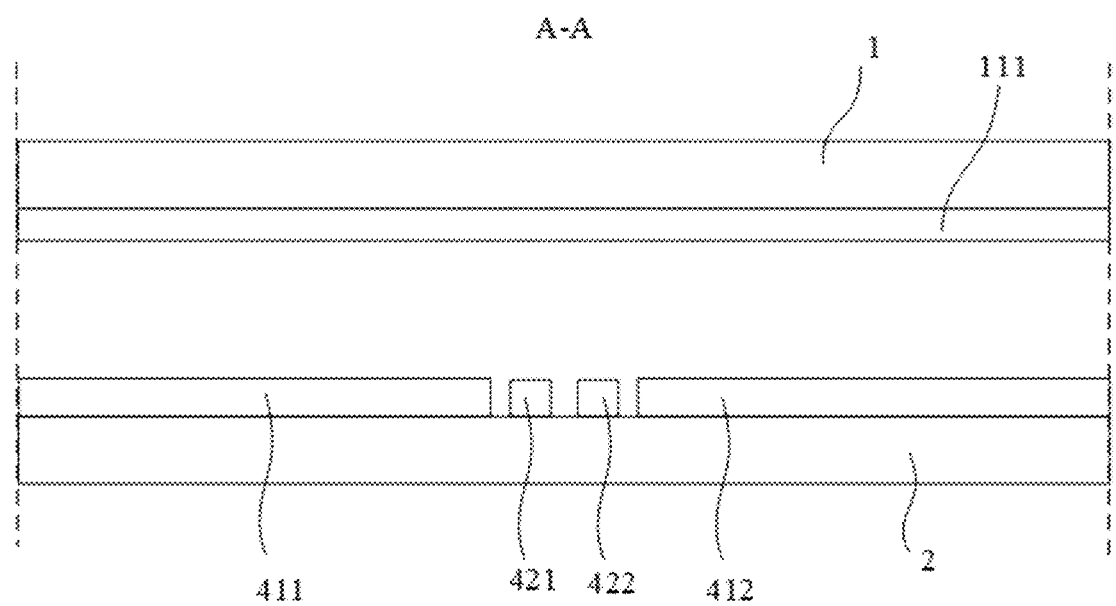
FIG. 7 is a cross-sectional view taken along line A-A in FIG. 5.
Figure 8:
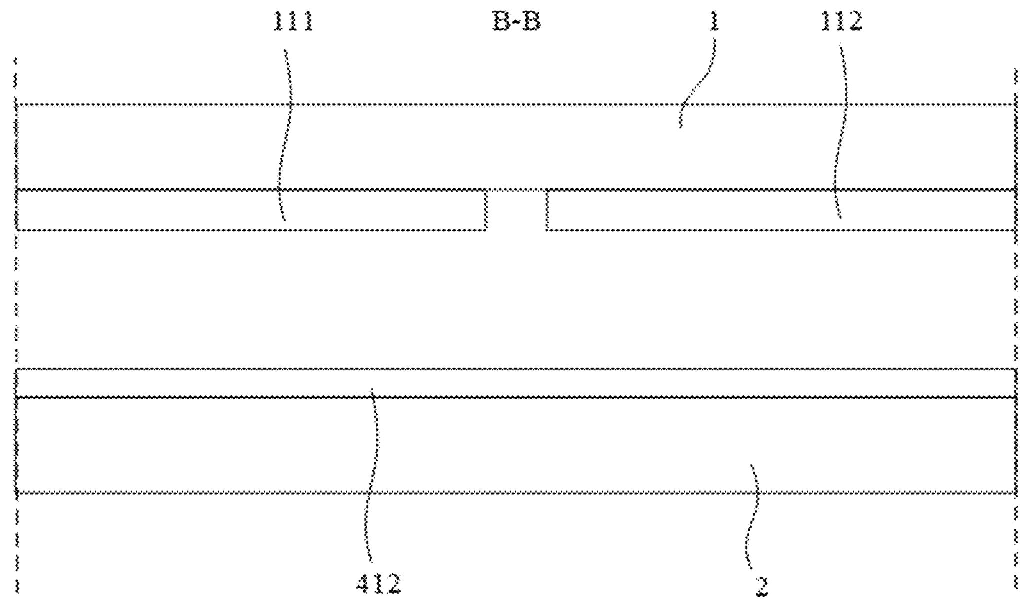
FIG. 8 is a cross-sectional view taken along line B-B in FIG. 5.

Referring to FIG. 4, the electronic paper display provided in the first embodiment of the present application includes a first substrate 1 and a second substrate 2 arranged opposite each other, and an electronic ink layer 3 disposed between the first substrate 1 and the second substrate 2. A side of the first substrate 1 facing the electronic ink layer 3 is provided with a common electrode 10, and a side of the second substrate 2 facing the electronic ink layer 3 is provided with a plurality of pixel units 4, The electronic ink layer 3 includes a plurality of microcapsules 30, and each microcapsule 30 is provided with potential particles 300 of at least two colors.

The above-mentioned potential particles 300 may also be referred to as electrophoretic particles, which means that the particles will migrate under the influence of an electric field. The electrophoretic particles are predominantly titanium dioxide particles, which are dispersed in hydrocarbon oil, with the addition of black fuel, surfactants, and charge control agents that charge the particles. The mixture is placed between parallel conductive plates.

In some embodiments, a transparent liquid is also provided in the microcapsule 30, and the potential particles 300 can move in the transparent liquid. By providing the transparent liquid in the microcapsule 30, the potential particles 300 are in a suspended state in the transparent liquid, so that the impact of external forces, such as gravity, on the potential particles 300 can be reduced, thereby facilitating the movement of the potential particles 300, improving the response speed of the electronic paper display, and avoiding residual images when the electronic paper display displays.

The transparent liquid in this application may be the same as the transparent liquid in the microcapsule 30 or microcup in the existing electronic paper display devices. For example, the transparent liquid may be tetrachlorethylene or xylene.

It should be noted that the first substrate 1 may include a first base substrate, and the common electrode 10 is directly disposed on the first base substrate. Apparently, the first substrate 1 may also include a first base substrate and a protective film covered on the first base substrate, and the common electrode 10 is disposed on the protective film.

In order to cater for thinner as well as more flexible displays in the market, the first substrate 1 of the electronic paper display provided by embodiments of the present invention may consist of a polymer. Organic polymers, such as polyimide and the like, have the characteristic of being easily bent and flexible, which can facilitate the flexible bending of electronic paper displays. Apparently, the first substrate 1 may also be made of glass material, which will not be described in detail herein. The material of the first substrate 1 may be adjusted according to actual needs. The second substrate 2 may be an array substrate, such as a glass substrate or a flexible polyimide substrate.

The first base substrate, the protective film, and the common electrode 10 are all light-transmissive, and the common electrode 10 may be made of ITO (tin-doped indium oxide) material. The protective film may be a transparent PET (polyester) film. The protective film may also be a polymer plastic film, which has strong anti-permeability against vapor, and may be tightly attached to the first substrate 1 using a laminator. This effectively prevents water vapor from intruding into the electronic ink layer 3 between the first substrate 1 and the second substrate 2, and prevents the electronic paper display from being damaged due to moisture. Furthermore, sealing glue may be evenly applied around the edges of the protective film to isolate water vapor and prevent water vapor from penetrating into the electronic ink layer 3 from the surrounding and causing damage to the electronic paper display.

Referring to FIGS. 5 to 8, the pixel unit 4 includes two sub-pixel electrodes 41. Each of the two sub-pixel electrodes 41 is connected to respective one of two source lines 42. The two source lines 42 are both connected to a gate line 43. The two source lines 42 and the two sub-pixel electrodes 41 are arranged at intervals along a first direction X. The common electrode 10 includes two sub-common electrodes 11 arranged at intervals along a second direction Y. The orthographic projections of the two sub-common electrodes 11 on the two sub-pixel electrodes 41 are spaced apart from each other to form four mutually independent sub-pixel opening areas 100.

The first direction X is the extending direction of the gate line 43, and the second direction Y is perpendicular to the first direction X.

In the embodiment of the present application, two source lines 42 are provided, dividing the pixel electrode 20 in the related art into two sub-pixel electrodes 41 and dividing the common electrode 10 in the related art into two sub-common electrodes 11. In contrast to the related art, where there is only one overlapping portion between the common electrode 10 and the pixel electrode 20, namely, there is only one pixel opening area, the embodiment of the present application provides four overlapping portions between the two sub-common electrodes 11 and the two sub-pixel electrodes 41, namely, there are four sub-pixel opening areas 100. That is, one pixel unit 4 has four sub-pixel opening areas 100 spaced apart from each other, and each sub-pixel opening area 100 displays a color so that the colors displayed by the four sub-pixel opening areas 100 can be combined to enable one pixel unit 4 to display multiple different colors, thereby effectively improving the color depth of the pixel unit 4. Since the display panel includes a plurality of pixel units 4, the display panel can display more colors and enhance the color gamut thereof.

It should be noted that, in the same manner as the connection method of the gate line 43, the source line 42 and the pixel electrode 20 in the related art, in the embodiment of the present application, the two source lines 42 are both connected to the gate line 43, and each of the two source lines 42 is connected to respective one of the two sub-pixel electrodes 41.

In some embodiments, the source lines 42 are used to apply a constant driving voltage to the sub-pixel electrodes 41 within a preset duration, so that a threshold voltage is formed between the sub-pixel electrode 41 corresponding to each sub-pixel opening area 100 and the sub-common electrode 11.

The threshold voltage is the voltage that drives the potential particles 300 to move toward the first substrate 1. Specifically, a constant voltage is maintained on the sub-common electrode 11, and a constant driving voltage is applied to the sub-pixel electrode 41, such that a certain voltage difference will be formed between the sub-pixel electrode 41 and the sub-common electrode 11, and the voltage difference is the threshold voltage of the potential particles 300 at the sub-pixel opening corresponding to the pixel electrode 41.

It should be noted that the voltage on each sub-common electrode 11 may be the same or different, and the driving voltage applied to each sub-pixel electrode 41 may be the same or different. By adjusting the voltage on the sub-common electrode 11 and the driving voltage applied to the sub-pixel electrode 41, the voltage difference between the sub-common electrode 11 and the sub-pixel electrode 41 can be changed, so that the threshold voltage of the potential particles 300 corresponding to the overlapping area of the projection of the sub-common electrode 11 on the second substrate 2 and the projection of the sub-pixel electrode 41 on the second substrate 2 can vary, so as to change the color displayed by the sub-pixel opening area 100 corresponding to the overlapping area.

In the embodiment of the present application, each source line 42 corresponds to a sub-pixel electrode 41 and is used to transmit the driving voltage to the sub-pixel electrode 41. The two source lines 42 may be connected to the same driver chip or different driver chips. When the two source lines 42 are connected to the same driver chip, the driver chip needs to output driving voltages of different magnitudes to different source lines 42. This can ensure the values of the driving voltages transmitted by different source lines 42 are not equal, but in this case, there are certain requirements for the performance of the driver chip.

When the two source lines 42 are connected to different driver chips, the present application includes a plurality of driver chips, and the two source lines 42 are each correspondingly connected to one driver chip. In this way, the control of the color display of different sub-pixel opening areas 100 can be better distinguished, the color display of different sub-pixel opening areas 100 can be controlled independently, and control of the color display of different sub-pixel opening areas 100 can be improved, thereby enhancing the color depth of the color displayed by the pixel unit 4.

Figure 9:
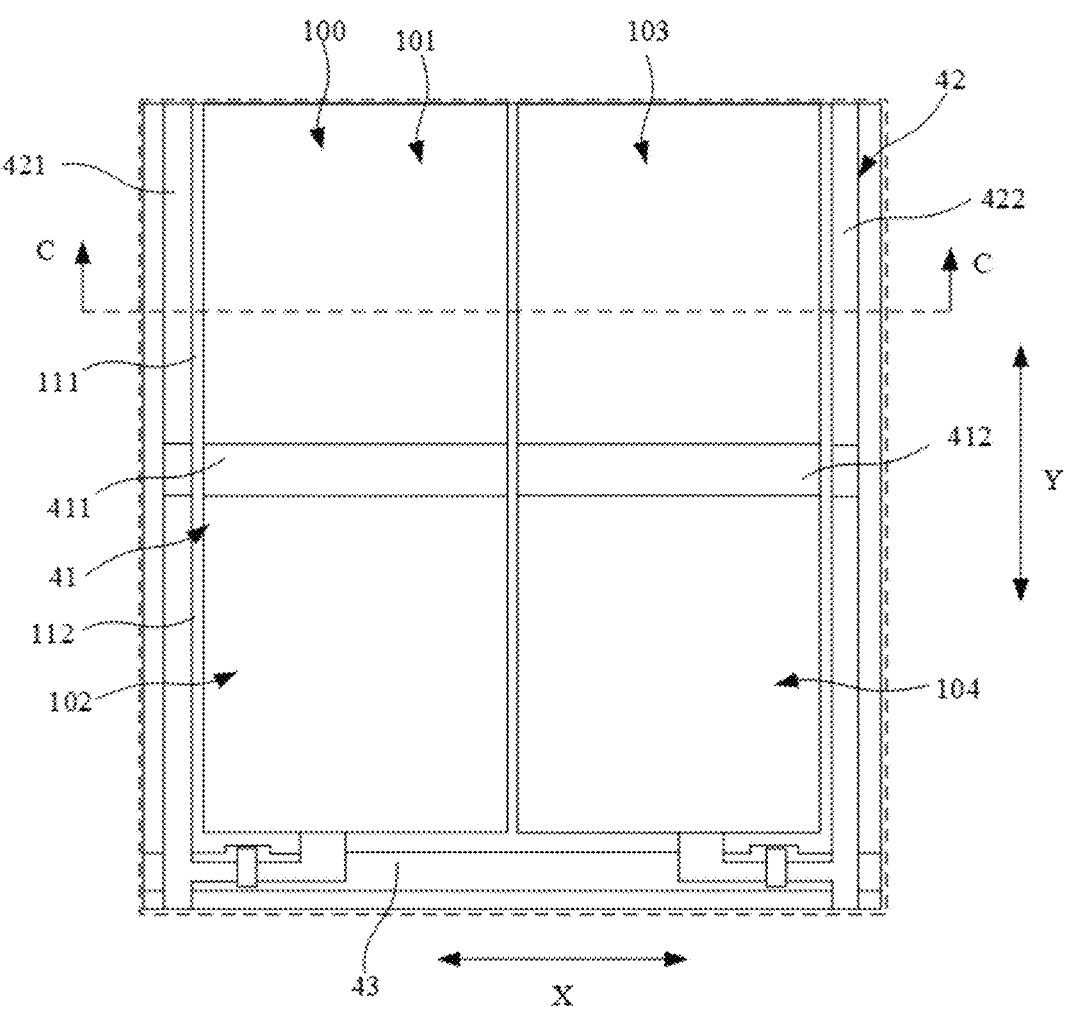
FIG. 9 is a second top view of the pixel unit of the electronic paper display provided in the first embodiment of the present application.
Figure 10:
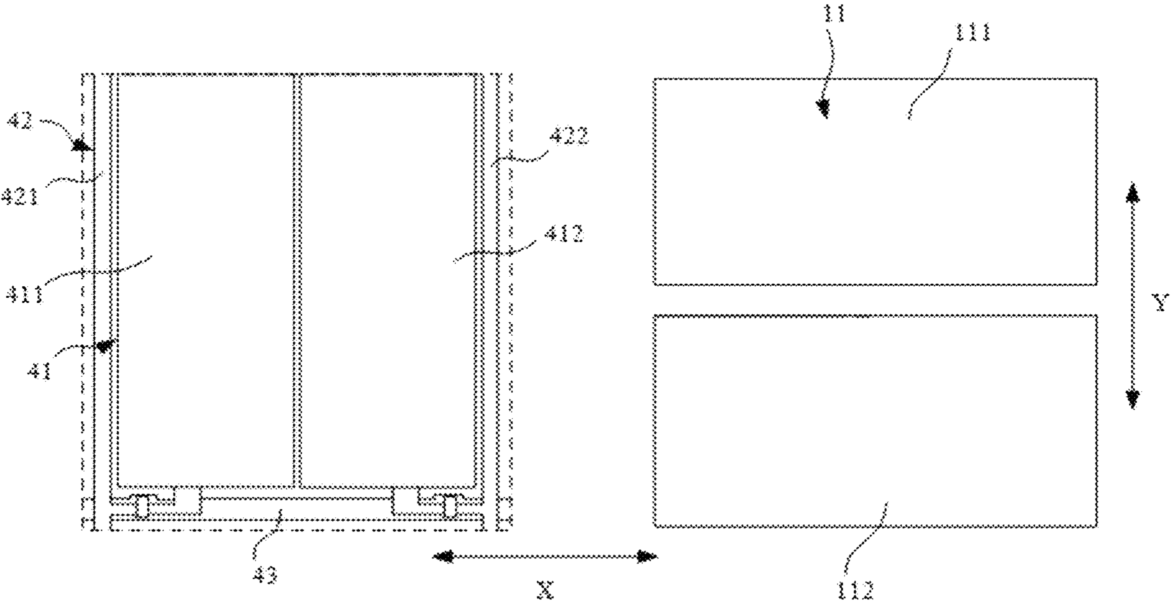
FIG. 10 is an exploded view of FIG. 9.
Figure 11:
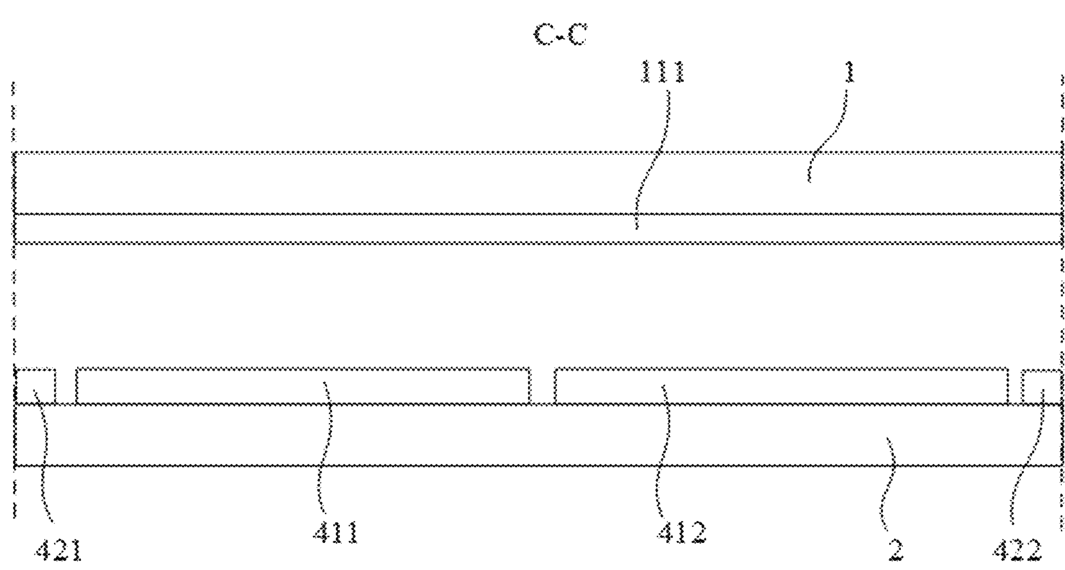
FIG. 11 is a cross-sectional view taken along line C-C in FIG. 9.

In the embodiment of the present application, two source lines 42 and two sub-pixel electrodes 41 are arranged at intervals along the first direction X. Specifically, the two source lines 42 and the two sub-pixel electrodes 41 may be disposed on the same layer, which can effectively utilize the layer structure on the second substrate 2 and reduce the thickness of the film layer, which is beneficial to the miniaturization of the electronic paper display. Referring to FIGS. 5 to 8, two source lines 42 are both disposed between two sub-pixel electrodes 41, and each source line 42 is connected to its adjacent sub-pixel electrode 41 respectively, which facilitates connection. Apparently, the application is not limited thereto. Referring to FIGS. 9 to 11, two sub-pixel electrodes 41 are both disposed between the two source lines 42, and each sub-pixel electrode 41 is connected to its adjacent source line 42, so that the length of the source line 42 and the space occupied by the source line 42 on the second substrate 2 can be reduced, making the wiring layout on the second substrate 2 more compact and reasonable.

In some embodiments, referring to FIGS. 5 to 11, the two source lines 42 are respectively a first source line 421 and a second source line 422, the two sub-pixel electrodes 41 are respectively a first sub-pixel electrode 411 and a second sub-pixel electrode 412, and the two sub-common electrodes 11 are respectively a first sub-common electrode 111 and a second sub-common electrode 112. The first source line 421 is connected to the first sub-pixel electrode 411, for applying a constant first driving voltage to the first sub-pixel electrode 411 within a preset duration, so that a first threshold voltage is formed between the first sub-pixel electrode 411 and the first sub-common electrode 111, and a second threshold voltage is formed between the first sub-pixel electrode 411 and the second sub-common electrode 112. The second source line 422 is connected to the second sub-pixel electrode 412, for applying a constant second driving voltage to the second sub-pixel electrode 412 within a preset duration, so that a third threshold voltage is formed between the second sub-pixel electrode 412 and the first sub-common electrode 111 and a fourth threshold voltage is formed between the second sub-pixel electrode 412 and the second sub-common electrode 112.

Specifically, the first source line 421 and the second source line 422 are arranged at intervals along the first direction X, the first sub-pixel electrode 411 and the second sub-pixel electrode 412 are arranged at intervals along the first direction X, and the first sub-common electrode 111 and the second sub-common electrode 112 are arranged at intervals along the second direction Y. In this manner, an overlapping area between the orthographic projection of the first sub-common electrode 111 on the second substrate 2 and the orthographic projection of the first sub-pixel electrode 411 on the second substrate 2 is the first sub-pixel opening area 101, and a threshold voltage of the potential particles 300 corresponding to the first sub-pixel opening area 101 is the first threshold voltage. An overlapping area between the orthographic projection of the second sub-common electrode 112 on the second substrate 2 and the orthographic projection of the first sub-pixel electrode 411 on the second substrate 2 is the second sub-pixel opening area 102, and a threshold voltage of the potential particles 300 corresponding to the second sub-pixel opening area 102 is the second threshold voltage. An overlapping area between the orthographic projection of the first sub-common electrode 111 on the second substrate 2 and the orthographic projection of the second sub-pixel electrode 412 on the second substrate 2 is the third sub-pixel opening area 103, and a threshold voltage of the potential particles 300 corresponding to the third sub-pixel opening area 103 is the third threshold voltage. An overlapping area between the orthographic projection of the second sub-common electrode 112 on the second substrate 2 and the orthographic projection of the second sub-pixel electrode 412 on the second substrate 2 is the fourth sub-pixel opening area 104, and a threshold voltage of the potential particles 300 corresponding to the four sub-pixel opening area 104 is the fourth threshold voltage.

In some embodiments, referring to FIG. 4, the microcapsule 30 is provided with black potential particles and white potential particles, the threshold voltage of the black potential particles is a positive voltage, and the threshold voltage of the white potential particles is a negative voltage. The value of the driving voltage is variable, and the values of the threshold voltages are variable, and each pixel unit 4 has five gray levels.

It should be noted that the black potential particles and white potential particles in the microcapsule 30 shown in FIG. 4 are merely two colors used to refer to two different colors of potential particles 300, and are not limited to that black potential particles can only be represented as black in the drawing, white potential particles can only be represented as white in the drawing.

Figure 12:
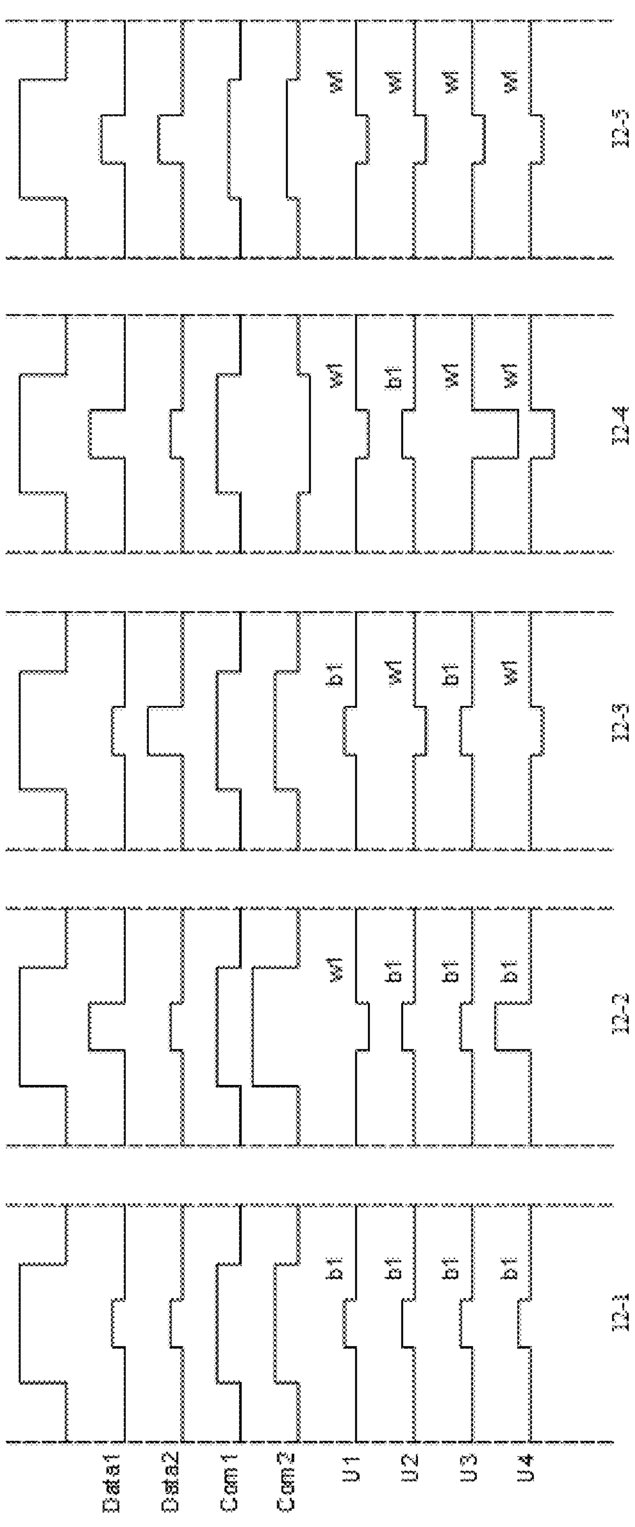
FIG. 12 is a schematic diagram showing the voltage signal timing and the threshold voltages of four sub-pixel opening areas of the pixel unit displaying five gray levels of the electronic paper display provided in the first embodiment of the present application.

Referring to FIG. 12, which is a schematic diagram showing the voltage signal timing and the threshold voltages of four sub-pixel opening areas 100 of the pixel unit 4 displaying five gray levels of the electronic paper display provided in the first embodiment of the present application. Specifically, the gate line 43 provides a signal Gate, the first source line 421 provides a signal Data1, the second source line 422 provides a signal Data2, the first sub-common electrode 111 provides a signal Com1, and the second sub-common electrode 112 provides a signal Com2. The threshold voltage of the sub-pixel opening area 100 is the voltage difference U between the signal Com and the signal Data. When the voltage difference U between the signal Com and the signal Data is a positive voltage, the sub-pixel opening area 100 displays black. When U is a negative voltage, the sub-pixel opening area 100 displays white. As shown in 12-1, U1, U2, U3, and U4 are all positive voltages, that is, the first sub-pixel opening area 101, the second sub-pixel opening area 102, the third sub-pixel opening area 103 and the fourth sub-pixel opening area 104 all display black b1, and the entire pixel unit 4 displays black b. As shown in 12-2, U1 is a negative voltage, U2 is a positive voltage, U3 is a positive voltage, and U4 is a positive voltage, so that correspondingly, the first sub-pixel opening area 101 displays white w1, the second sub-pixel opening area 102 displays black b1, the third sub-pixel opening area 103 displays black b1, the fourth sub-pixel opening area 104 displays black b1, and the entire pixel unit 4 displays gray g1. In the same manner, pixel unit 4 of 12-3 displays gray g2, pixel unit 4 of 12-4 displays gray g3, and pixel unit 4 of 12-5 displays white w. Such that, when the voltage differences between the signal Com and the signal Data are different, one pixel unit 4 can achieve a display effect with five gray levels (b, g1, 92, g3, and w) and improve the color depth of the displayed color of the pixel unit 4, thereby further improving the color gamut of the electronic paper display.

In some embodiments, an area of the orthographic projection of the first sub-common electrode 111 on the first sub-pixel electrode 411, an area of the orthographic projection of the second sub-common electrode 112 on the first sub-pixel electrode 411, and an area of the orthographic projection of the first sub-common electrode 111 on the second sub-pixel electrode 412, and an area of the orthographic projection of the second sub-common electrode 112 on the second sub-pixel electrode 412 are equal, such that the areas of the first sub-pixel opening area 101, the second sub-pixel opening area 102, the third sub-pixel opening area 103 and the fourth sub-pixel opening area 104 can be equal, so that the brightness of the colors displayed in each sub-pixel opening area 100 is more uniform, thereby enhancing mixing effect of the colors.

Specifically, the areas of the first sub-common electrode 111 and the second sub-common electrode 112 may be configured to be equal, and the size of the first sub-common electrode 111 in the second direction Y is equal to that of the second sub-common electrode 112 in the second direction Y. The areas of the first sub-pixel electrode 411 and the second sub-pixel electrode 412 are configured to be equal, and the size of the first sub-pixel electrode 411 in the first direction X is equal to the size of the second sub-pixel electrode 412 in the first direction X, so that the areas of the four sub-pixel opening areas 100 can be equal.

Second Embodiment

Figure 13:
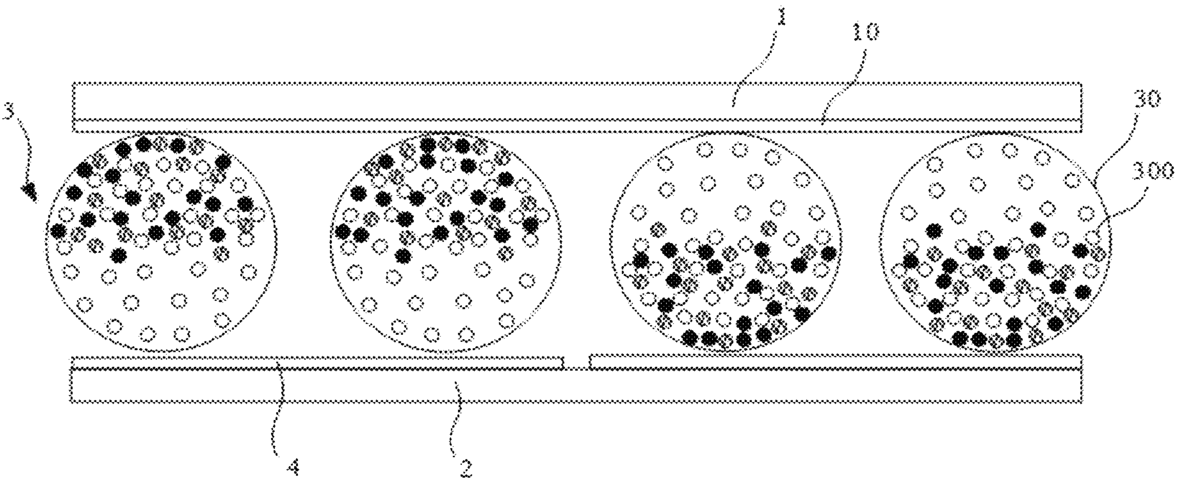
FIG. 13 is a schematic structural view of an electronic paper display provided in a second embodiment of the present application.

Referring to FIG. 13, compared with the first embodiment, the only difference of the electronic paper display provided in the second embodiment of the present application is the number of colors of the potential particles 300 provided in the microcapsules 30. In the second embodiment of the present application, the microcapsule 30 is provided with red potential particles, green potential particles, and blue potential particles. The threshold voltage of the red potential particles is a positive voltage, the threshold voltage of the green potential particles is zero voltage, and the threshold voltage of the blue potential particles is a negative voltage. The value of the driving voltage is variable, the values of the threshold voltages are variable, and each pixel unit 4 has seven gray levels.

It should be noted that the three potential particles 300 with different appearances in the microcapsule 30 shown in FIG. 13 are used to represent red potential particles, green potential particles, and blue potential particles respectively, and are not limited to that potential particles 300 with a certain appearance represents potential particles 300 of a specific color.

Figure 14:
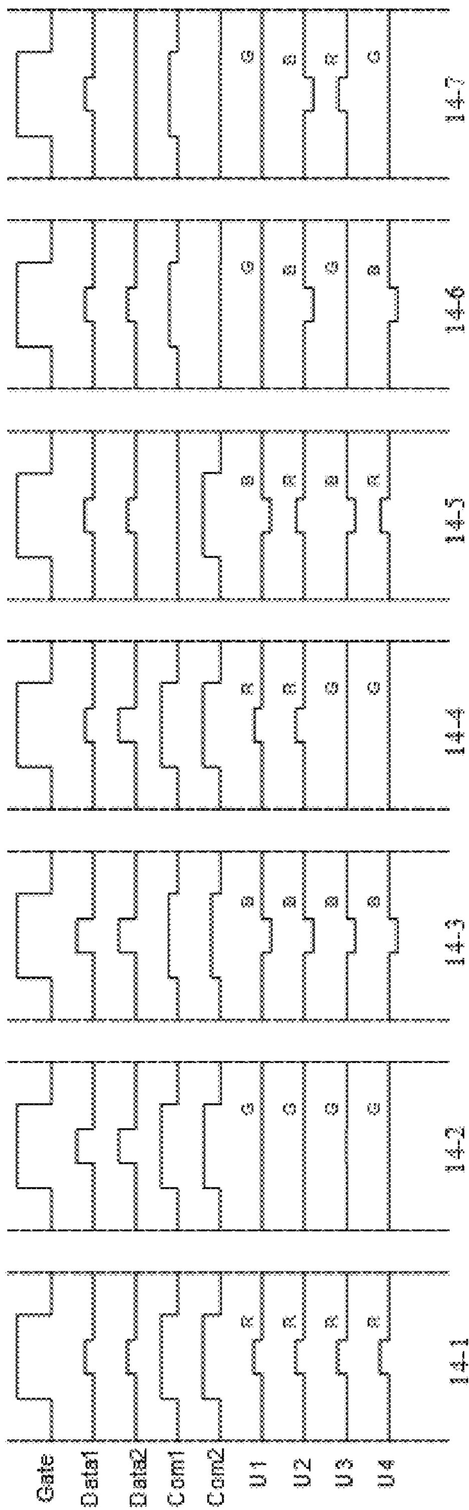
FIG. 14 is a schematic diagram showing the voltage signal timing and the threshold voltages of four sub-pixel opening areas of the pixel unit displaying seven gray levels of the electronic paper display provided in the second embodiment of the present application.

Referring to FIG. 14, which is a schematic diagram showing the voltage signal timing and the threshold voltages of four sub-pixel opening areas 100 of the pixel unit 4 displaying seven gray levels of the electronic paper display provided in the second embodiment of the present application. Specifically, the gate line 43 provides a signal Gate, the first source line 421 provides a signal Data1, the second source line 422 provides a signal Data2, the first sub-common electrode 111 provides a signal Com1, and the second sub-common electrode 112 provides a signal Com2. The threshold voltage of the sub-pixel opening area 100 is a voltage difference U between the signal Com and the signal Data. When the voltage difference U between the signal Com and the signal Data is a positive voltage, the sub-pixel opening area 100 displays red. When U is zero voltage, the sub-pixel opening area 100 displays green. When U is a negative voltage, the sub-pixel opening area 100 displays blue. As shown in 14-1, U1, U2, U3, and U4 are all positive voltages, that is, the first sub-pixel opening area 101, the second sub-pixel opening area 102, the third sub-pixel opening area 103 and the fourth sub-pixel opening area 104 all display red R, and the entire pixel unit 4 displays red R. As shown in 14-2, U1, U2, U3, and U4 are all zero voltage, that is, the first sub-pixel opening area 101, the second sub-pixel opening area 102, the third sub-pixel opening area 103 and the fourth sub-pixel opening area 104 all display green G, and the entire pixel unit 4 displays green G. As shown in 14-3, U1, U2, U3, and U4 are all negative voltages, that is, the first sub-pixel opening area 101, the second sub-pixel opening area 102, the third sub-pixel opening area 103 and the fourth sub-pixel opening 104 all display blue B, and the entire pixel unit 4 displays blue B. As shown in 14-4, U1 is a positive voltage, U2 is a positive voltage, U3 is zero voltage, and U4 is zero voltage. Correspondingly, the first sub-pixel opening area 101 displays red R, the second sub-pixel opening area 102 displays red R, the third sub-pixel opening area 103 displays green G, and the fourth sub-pixel opening area 104 displays green G, and the entire pixel unit 4 displays a mixed color Mix1. Similarly, the pixel unit 4 of 14-5 displays a mixed color Mix2, the pixel unit 4 of 14-6 displays a mixed color Mix3, and the pixel unit 4 of 14-7 displays a mixed color Mix4, such that when the voltage differences between the signal Com and the signal Data are different, one pixel unit 4 can achieve a display effect of seven gray levels (R, G, B, Mix1, Mix2, Mix3, and Mix4), improving the color depth of the pixel unit 4, thereby enhancing the color gamut of the electronic paper display.

Third Embodiment

Referring to FIG. 15, the third embodiment of the present application provides a driving method for an electronic paper display, which is applied to the electronic paper display in the first embodiment above and includes the following steps:

- providing black potential particles and white potential particles in the microcapsule 30, the threshold voltage of the black potential particles is a positive voltage, and the threshold voltage of the white potential particles is a negative voltage; and
- applying, during a display phase of the electronic paper display, a driving voltage to the sub-pixel electrode 41 and a common voltage to the sub-common electrode 11, the values of the driving voltage and the common voltage are both variable, by adjusting the voltage difference between the driving voltage and the common voltage, the threshold voltage corresponding to the sub-pixel opening area 100 can be changed and the pixel unit 4 can display five gray levels.

The microcapsules 30 of the electronic ink layer 3 in the embodiment of the present application are provided with black potential particles and white potential particles. By changing the values of the driving voltage and the common voltage, the threshold voltage of the potential particles 300 corresponding to the sub-pixel opening area 100 can be changed. As a result, the display color of the sub-pixel opening area 100 changes. Each sub-pixel opening area 100 can display two different colors. By mixing the colors of the four sub-pixel opening areas 100, one pixel unit 4 can display five gray levels, effectively improving the color depth of the display color of the pixel unit 4, thereby further improving the color gamut of the electronic paper display.

Fourth Embodiment

Referring to FIG. 16, the fourth embodiment of the present application provides a driving method for an electronic paper display, which is applied to the electronic paper display in the second embodiment above and includes the following steps:

providing red potential particles, green potential particles and blue potential particles in the microcapsule 30, the threshold voltage of the red potential particles is a positive voltage, the threshold voltage of the green potential particles is zero voltage, and the threshold voltage of the blue potential particles is a negative voltage; and applying, during a display phase of the electronic paper display, a driving voltage to the sub-pixel electrode 41 and a common voltage to the sub-common electrode 11, the values of the driving voltage and the common voltage are both variable, by adjusting the voltage difference between the driving voltage and the common voltage, the threshold voltage corresponding to the sub-pixel opening area 100 can be changed and the pixel unit 4 can display seven gray levels.

The microcapsules 30 of the electronic ink layer 3 in the embodiment of the present application are provided with red potential particles, green potential particles and blue potential particles. By changing the values of the driving voltage and the common voltage, the threshold voltage of the potential particles 300 corresponding to the sub-pixel opening area 100 can be changed and the display color of the sub-pixel opening area 100 can be changed. Each sub-pixel opening area 100 can display three different colors, by mixing the colors of the four sub-pixel opening areas 100, a pixel unit 4 can display seven gray levels, effectively improving the color depth of the display color of the pixel unit 4, thereby further improving the color gamut of the electronic paper display.

The above are only specific embodiments of the present application, but the protection scope of the present application is not limited thereto. One skilled in the art can readily envisage changes or substitutions within the technical scope disclosed in the present application. Those shall be covered by the protection scope of this application. Therefore, the scope of protection of this application should be subject to the scope of protection of the appended claims.

What is claimed is:

1. An electronic paper display, comprising:

a first substrate (1) and a second substrate (2) arranged oppositely to each other, and an electronic ink layer (3) disposed between the first substrate (1) and the second substrate (2), a common electrode (10) being disposed on a side of the first substrate (1) facing the electronic ink layer (3), and a plurality of pixel units (4) being disposed on a side of the second substrate (2) facing the electronic ink layer (3), wherein, each pixel unit (4) comprises two sub-pixel electrodes (41), the two sub-pixel electrodes (41) are each connected to respective one of two source lines (42), and the two source lines (42) are both connected to a gate line (43);

the two source lines (42) and the two sub-pixel electrodes (41) are arranged at intervals along a first direction (X), and the first direction (X) is an extension direction of the gate line (43); and the common electrode (10) comprises two sub-common electrodes (11) arranged at intervals along a second direction (Y), and orthographic projections of the two sub-common electrodes (11) on the two sub-pixel electrodes (41) are spaced apart from each other to form four mutually independent sub-pixel opening areas (100), the second direction (Y) is perpendicular to the first direction (X).

2. The electronic paper display according to claim 1, wherein, the electronic ink layer (3) comprises a plurality of microcapsules (30), and each of the microcapsules (30) is provided with potential particles (300) of at least two colors; and the source lines (42) are configured to apply a constant driving voltage to the sub-pixel electrodes (41) within a preset duration, so that a threshold voltage is formed between a respective sub-pixel electrode (41) and a respective sub-common electrode (11) corresponding to each of the sub-pixel opening areas (100), the threshold voltage is a voltage that drives the potential particles (300) to move in a direction toward the first substrate (1).

3. The electronic paper display according to claim 2, wherein, the two source lines (42) are both disposed between the two sub-pixel electrodes (41);

alternatively, the two sub-pixel electrodes (41) are both disposed between the two source lines (42).

4. The electronic paper display according to claim 2, wherein, the two source lines (42) are respectively a first source line (421) and a second source line (422), the two sub-pixel electrodes (41) are respectively a first sub-pixel electrode (411) and a second sub-pixel electrode (412), and the two sub-common electrodes (11) are respectively a first sub-common electrode (111) and a second sub-common electrode (112);

the first source line (421) is connected to the first sub-pixel electrode (411) for applying a constant first driving voltage to the first sub-pixel electrode (411) within a preset duration, so that a first threshold voltage is formed between the first sub-pixel electrode (411) and the first sub-common electrode (111), and a second threshold voltage is formed between the first sub-pixel electrode (411) and the second sub-common electrode (112); and the second source line (422) is connected to the second sub-pixel electrode (412) for applying a constant second driving voltage to the second sub-pixel electrode (412) within a preset duration, so that a third threshold voltage is formed between the second sub-pixel electrode (412) and the first sub-common electrode (111), and a fourth threshold voltage is formed between the second sub-pixel electrode (412) and the second sub-common electrode (112).

5. The electronic paper display according to claim 4, wherein, the electronic paper display further comprises a plurality of driver chips, and the first source line (421) and the second source line (422) are respectively connected to one of the driver chips.

6. The electronic paper display according to claim 4, wherein, an area of an orthographic projection of the first sub-common electrode (111) on the first sub-pixel electrode (411), an area of an orthographic projection of the second sub-common electrode (112) on the first sub-pixel electrode (411), an area of an orthographic projection of the first sub-common electrode (111) on the second sub-pixel electrode (412), and an area of an orthographic projection of the second sub-common electrode (112) on the second sub-pixel electrode (412) are equal.

7. The electronic paper display according to claim 5, wherein, the microcapsules (30) are provided with black potential particles and white potential particles, a threshold voltage of the black potential particles is a positive voltage, and a threshold voltage of the white potential particles is a negative voltage; and values of the driving voltages are variable, values of the threshold voltages are variable, and each of the pixel units (4) has five gray levels.

8. The electronic paper display according to claim 5, wherein, the two source lines (42) are both disposed between the two sub-pixel electrodes (41);

alternatively, the two sub-pixel electrodes (41) are both disposed between the two source lines (42).

9. The electronic paper display according to claim 4, wherein, an area of an orthographic projection of the first sub-common electrode (111) on the first sub-pixel electrode (411), an area of an orthographic projection of the second sub-common electrode (112) on the first sub-pixel electrode (411), an area of an orthographic projection of the first sub-common electrode (111) on the second sub-pixel electrode (412), and an area of an orthographic projection of the second sub-common electrode (112) on the second sub-pixel electrode (412) are equal.

10. The electronic paper display according to claim 4, wherein, the microcapsules (30) are provided with black potential particles and white potential particles, a threshold voltage of the black potential particles is a positive voltage, and a threshold voltage of the white potential particles is a negative voltage; and values of the driving voltages are variable, values of the threshold voltages are variable, and each of the pixel units (4) has five gray levels.

11. A driving method of an electronic paper display, applied to the electronic paper display according to claim 10, comprising:

providing black potential particles and white potential particles in the microcapsules (30), a threshold voltage of the black potential particles is a positive voltage, and a threshold voltage of the white potential particles is a negative voltage; and applying a driving voltage to the sub-pixel electrodes (41) and applying a common voltage to the sub-common electrodes (11) during a display phase of the electronic paper display, values of the driving voltage and the common voltage are both variable, by adjusting a voltage difference between the driving voltage and the common voltage, the threshold voltage corresponding to the sub-pixel opening areas (100) are changed, and each pixel unit (4) displays five gray levels.

12. The driving method according to claim 11, wherein, the electronic paper display further comprises a plurality of driver chips, and the first source line (421) and the second source line (422) are respectively connected to one of the driver chips.

13. The electronic paper display according to claim 4, wherein, the two source lines (42) are both disposed between the two sub-pixel electrodes (41);

alternatively, the two sub-pixel electrodes (41) are both disposed between the two source lines (42).

14. The electronic paper display according to claim 4, wherein, the microcapsules (30) are provided with red potential particles, green potential particles and blue potential particles, a threshold voltage of the red potential particles is a positive voltage, a threshold voltage of the green potential particles is zero voltage, and a threshold voltage of the blue potential particles is a negative voltage; and values of the driving voltages are variable, values of the threshold voltages are variable, and each of the pixel units (4) has seven gray levels.

15. A driving method of an electronic paper display, applied to the electronic paper display according to claim 14, comprising:

providing red potential particles, green potential particles and blue potential particles in the microcapsules (30), a threshold voltage of the red potential particles is a positive voltage, a threshold voltage of the green potential particles is zero voltage, and a threshold voltage of the blue particles is a negative voltage; and applying a driving voltage to the sub-pixel electrodes (41) and applying a common voltage to the sub-common electrodes (11) during a display phase of the electronic paper display;

values of the driving voltage and the common voltage are both variable, by adjusting a voltage difference between the driving voltage and the common voltage, the threshold voltage corresponding to the sub-pixel opening areas (100) are changed, and each pixel unit (4) displays seven gray levels.

16. The driving method according to claim 15, wherein, the electronic paper display further comprises a plurality of driver chips, and the first source line (421) and the second source line (422) are respectively connected to one of the driver chips.

17. The electronic paper display according to claim 5, wherein, the microcapsules (30) are provided with red potential particles, green potential particles and blue potential particles, a threshold voltage of the red potential particles is a positive voltage, a threshold voltage of the green potential particles is zero voltage, and a threshold voltage of the blue potential particles is a negative voltage; and values of the driving voltages are variable, values of the threshold voltages are variable, and each of the pixel units (4) has seven gray levels.

18. The electronic paper display according to claim 1, wherein, the two source lines (42) are both disposed between the two sub-pixel electrodes (41);

alternatively, the two sub-pixel electrodes (41) are both disposed between the two source lines (42).

* * * * *